Sept. 14, 1954     E. KOLISCH     2,688,878

EQUIPMENT FOR RATING BY VOLUME, WEIGHT, AND ZONE

Filed March 28, 1951     4 Sheets-Sheet 1

INVENTOR
Emil Kolisch
BY
Dean Fairbank & Hirsch
ATTORNEYS

Sept. 14, 1954 E. KOLISCH 2,688,878
EQUIPMENT FOR RATING BY VOLUME, WEIGHT, AND ZONE
Filed March 28, 1951 4 Sheets-Sheet 2

INVENTOR
*Emil Kolisch*
BY
*Dean Fairbank & Hirsch*
ATTORNEYS

Sept. 14, 1954  E. KOLISCH  2,688,878
EQUIPMENT FOR RATING BY VOLUME, WEIGHT, AND ZONE
Filed March 28, 1951 4 Sheets-Sheet 3

INVENTOR
*Emil Kolisch*
BY
*Dean Fairbank + Hirsch*
ATTORNEYS

Patented Sept. 14, 1954

2,688,878

UNITED STATES PATENT OFFICE 2,688,878

EQUIPMENT FOR RATING BY VOLUME, WEIGHT, AND ZONE

Emil Kolisch, New York, N. Y., assignor to Continental Silver Co., Inc., Brooklyn, N. Y., a corporation of New York Application March 28, 1951, Serial No. 217,934

19 Claims. (Cl. 73—432)

In the rating of rectangular objects and packages, as for instance for determining transportation charges by air express, post office, express, truck or other delivery service organizations, either the weight or the volume of the object or package may be the determining factor for the shipping charge. Ordinarily the weight of the object forms the basis for such charge, but where the object has a relatively large volume and a small weight, as for instance, boxed flowers, some transportation services base their charge on volume.

Where, in order to determine the shipping charge, an object must be measured by rule or tape and the length, width and height multiplied to determine volume, whether with or without resort to multiplication tables, and the weight of the object must be separately determined by placing it on a weighing scale and the two values compared in order to determine which is the proper basis of charge, such operations are time-consuming, costly and subject to error.

Where to measure the length, width and height of an object, a plurality of microswitches are utilized, positioned along the three axes of a three dimensional system of rectangular coordinates and the microswitches each has a spring urged plunger, depressed by the weight of an object placed thereagainst, to close the associated microswitch to measure such parameters through suitable means, it has been found that the spring urged plunger push the objects away therefrom, especially when such object is of little weight, causing the microswitches to open with resultant inaccurate measurement.

In addition where such microswitches are utilized, if the edges of the object being measured should be pushed in or if the object should be irregular in shape, some of the microswitches will not be actuated, also with resultant inaccuracy in measurement.

Where the microswitches are utilized to control a plurality of series connected resistors to place in circuit resistance of value correlated with the parameter being measured, a complicated arrangement is required, which is highly critical and difficult to adjust.

It is accordingly among the objects of the invention to provide a simple, expeditious and reliable equipment, with relatively few moving parts not likely to become deranged and which may readily be operated automatically, speedily and accurately to measure the volume of such object without need for microswitches or complicated resistance circuits and also to measure the weight of such object and to rate such objects according to volume or weight and (based on a predetermined relation between volume and weight, which relation may be varied at will), automatically to determine which of such ratings, whether for volume or for weight, will be the basis for shipment charge of such object and automatically to indicate such charge, without the need for manually measuring the object, consulting tables or doing calculations of any sort.

According to the invention, from its broader aspect, each of the three dimension of length, width and height of the rectangular object is determined by the coaction with such object of suitable measuring means, which through electrical circuits automatically determines such parameters and the volume classification of such object. Simultaneously the weight classification of the object is determined by means of a suitable weighing scale on which the object may rest while determining the volumetric classification.

The classifications simultaneously effected of volume and weight are automatically correlated, according to the invention, in such manner that within a given range of relationship between volume and weight, the weight controls the charge rating desirably registered on a meter, while outside of that range the basis of the meter rating is automtaically shifted for volume to be the controlling parameter.

The volume measuring portion of the rating equipment desirably comprises a frame having a horizontal platform and an end and rear wall, each having a slidable measuring member which may be moved to engage the extremities of the object to determine its maximum dimensions such as its length, width and height respectively, and the weight measuring portion comprises a weighing scale associated with the frame and carrying the latter so that an object placed on said platform simultaneously will have its dimensions and weight determined.

Each of the slidable members controls a switch which automatically places in circuit a current limiting means or resistance having a value correlated respectively with the three parameters being measured. By connecting the three resistances in parallel, the output from such parallel circuit will be the sum of the currents therethrough. The resistances controlled by the switches are so calibrated that the current therethrough is proportional to the logarithm of each dimension of the object being measured. Consequently the sum of the currents through the three resistances connected in parallel will be proportional to the sum of such logarithms so that an anti-logarithmic scale on an appropriate indicating device or meter actuated by such combined current will indicate the product or volumetric rating of the object being measured, and of course can render such reading in monetary value as is ordinarily preferred. Simultaneously with the metering of volume the weighing scale is designed to place in circuit current limiting means or a resistance correlated with the weight of the object.

In one application in which the reading is effected only by weight or only by volume, but in which the relation of weight to volume automatically determines the reading controlling factor, the current limiting means or resistances controlled by volume and those controlled by weight are so correlated that for corresponding numerical values in the volume sequence and the weight sequence, the currents passed thereby are equal. That is, for a given volume, a given weight is to have the same monetary rating and that relationship between volume and weight is proportionally maintained throughout the range of the equipment. To this end, a bank of resistances is controlled by the weighing scale and the magnitude of each resistance element in that bank is equal to the magnitude of resistance of the parallel connected resistances which determine the corresponding volume rating.

Of the two currents (weight controlled and volume controlled), that which preponderates, controls the reading of the meter and in the preferred embodiment, when the currents are equal, it is the weight current that controls the meter. To effect such control, it is preferred to connect the parallel connected volume resistances and the weight resistances in a suitable discriminator circuit, such as for example, a Wheatstone bridge, in which the volume resistances form one arm thereof and the weight resistance forms another arm thereof. A relay across such bridge is actuated by predominance, say of volume controlled current, to shift the connection for feeding volume controlled current to the meter, and the relay is biased to feed weight controlled current to such meter at all other times.

In order to insure correct readings on the rating meter, according to another feature of the invention, the rating meter is in a circuit separate and distinct from the bridge circuit, and such separate circuit includes sets of resistors, identical respectively to those heretofore described for volume and weight determination and the two sets of resistors are controlled by interrelated switches so that the resistance connected in circuit of both sets of resistors is in all respects identical at all times.

This application is a continuation-in-part of copending application Serial No. 201,905, filed December 21, 1950.

In the accompanying drawings in which are shown one or more of various possible embodiments of the several features of the invention.

Before proceeding to a description of the circuits, an equipment with which the invention may be practiced, will be briefly described.

The rating equipment will be described as suitable for rating by volume, objects up to a length of five units, height of five units and width of five units in increments of one unit, from two units up and for rating by weight objects up to five units in increments of one unit from one unit up. It is of course to be understood that the equipment could rate objects of much greater range of size or weight and the above simple example herein illustrate the principles of the invention. The units of length, width and height may be centimeters, meters, inches, feet, yards or any arbitrary unit of length as desired, and the units of weight may be grams, ounces or pounds, or any arbitrary unit of weight as desired.

Figure 1:
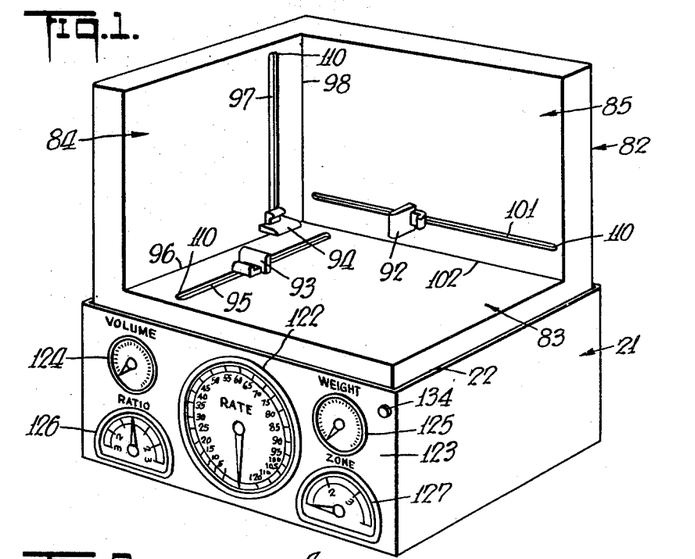
Fig. 1 is a perspective view of an illustrative equipment for rating rectangular objects.
Figure 5:
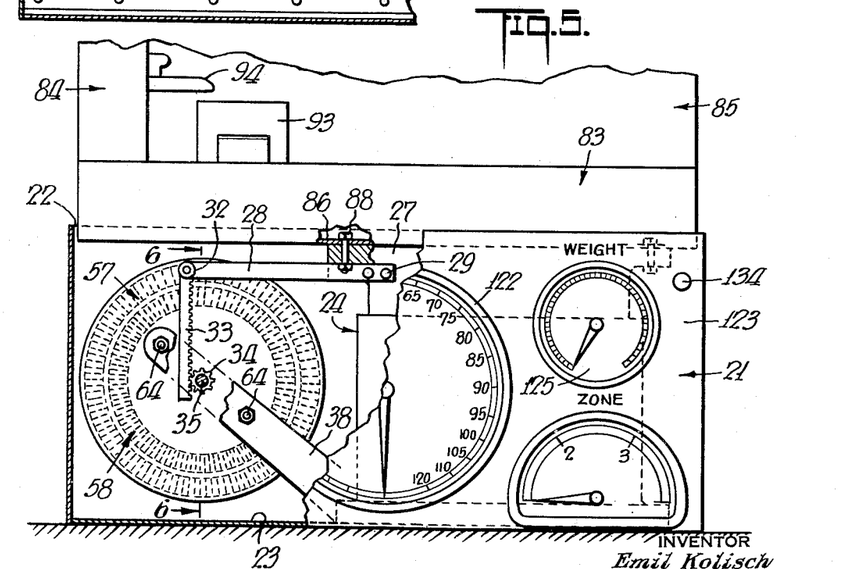
Fig. 5 is a front elevational view of the equipment shown in Fig. 1 on a larger scale with parts broken away.

In Fig. 1 is shown a rectangular housing 21 illustratively a box of any suitable material having an open top 22. Mounted on the floor 23 of the housing 21 as shown in Fig. 5, are weight determining means such as a weighing scale 24 which may be of any suitable type, such as for example, that put out by Pitney-Bowes Company and designated by the trade-mark "Postometer" and such weighing scale will only be described to the extent necessary for a clear understanding of the invention. As shown in Fig. 5 the weighing scale comprises a vertically movable support 27 controlled by a weight placed thereon to move the actuating arm 28 affixed thereto as at 29.

Figure 6:
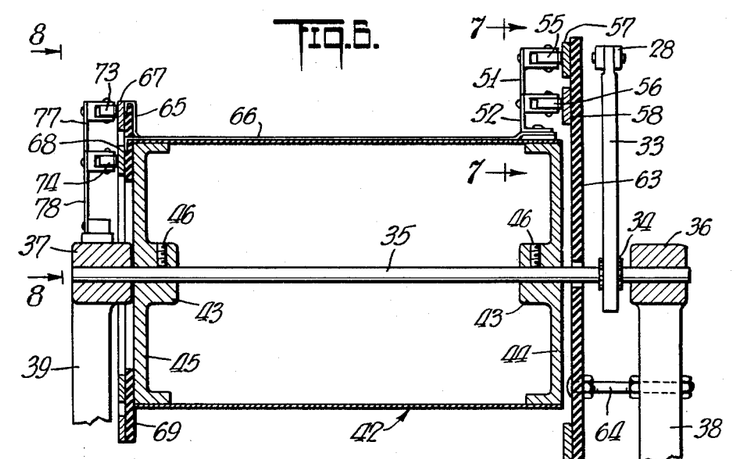
Fig. 6 is a sectional view on a larger scale taken along line 6—6 of Fig. 5.

The free end 32 of the actuating arm 28 carries a rack 33 which engages a pinion 34 affixed on a transverse shaft 35 rotatively mounted in suitable bearings 36 and 37 as shown in Fig. 6 at the free ends of fixed arms 38 and 39 respectively extending obliquely upwardly from the bottom of the weighing scale 24. Mounted on shaft 35 as shown in Fig. 6 is a drum 42 which desirably has axial hubs 43 on each of the end walls 44 and 45 thereof, said hubs being rigidly affixed to said transverse shaft by means of set screws 46.

Figure 7:
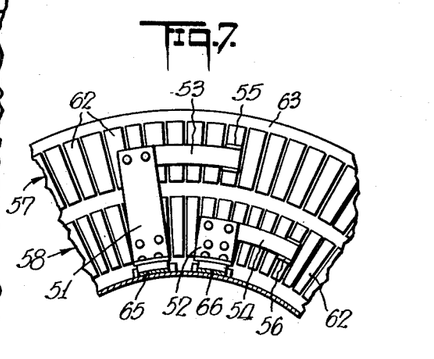
Fig. 7 is a sectional view on a larger scale taken along line 7—7 of Fig. 6.

Affixed on the periphery of the drum 42 adjacent end wall 44 thereof, and extending radially outward therefrom, are a pair of brackets 51 and 52, shown in Figs. 6 and 7, which are circumferentially displaced from each other, one of said brackets illustratively bracket 51 being of greater length than the other. Affixed to the free end of each of the brackets 51 and 52 and extending laterally outward therefrom, desirably in the same direction, are leaf springs 53 and 54 each carrying a roller 55 and 56 respectively at the free end thereof.

Association with each of the rollers 55 and 56 and engaged thereby are concentric contact rings 57 and 58 respectively, each of which, as shown in Figs. 6 and 7, desirably comprise a plurality of contact strips 62 affixed to and radially arranged on a plate 63 of insulating material affixed by spacer bolts 64 to arm 38, said plates 63 lying in a plane parallel to end wall 44 of drum 42 and being interposed between said end wall 44 and rack 33.

Figure 8:
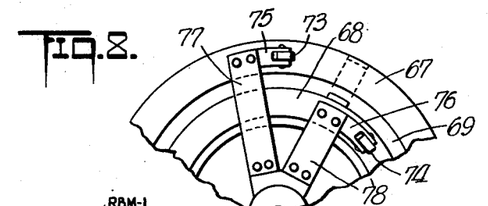
Fig. 8 is a detail view taken along line 8—8 of Fig. 6.

The rollers 55 and 56 are electrically connected through brackets 51 and 52 and conducting strips 65 and 66 on drum 42, extending longitudinally thereof, to annular slip rings 67 and 68 respectively of conducting material mounted on a plate 69 of insulating material affixed to end wall 45 of the drum. As shown in Figs. 6 and 8, slip rings 67 and 68 are engaged respectively by rollers 73 and 74 mounted at the ends of leaf springs 75 and 76 affixed to and extending laterally outward from brackets 77 and 78 mounted on arm 39 and insulated therefrom.

Figure 2:
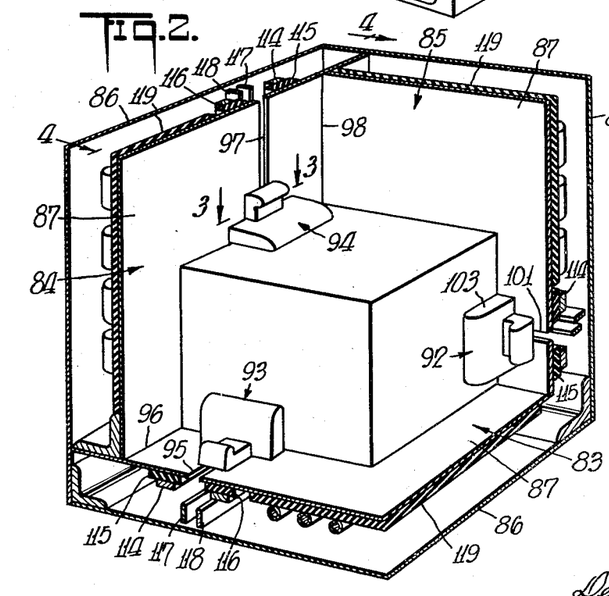
Fig. 2 is a fragmentary sectional view on a larger scale of a corner of the equipment shown in Fig. 1.

Mounted on the vertical support 27 of the weighing scale is a frame 82 by means of which the dimensions of the object being rated can be measured. As shown in Figs. 1, 2 and 5 the frame 82 desirably comprises a substantially rectangular platform 83, of dimensions slightly less than that of the open top 22 of the rectangular housing 21, an end wall 84 and a rear wall 85, said platform and said walls each desirably comprising a pair of spaced parallel plates 86 and 87, as shown in Fig. 2, the plate 86 of platform 83 which forms the floor of frame 82 being affixed to support 27 as by bolts 88 (Fig. 5).

In order to determine the length, width and height respectively of the rectangular object to be rated, the frame 82 desirably has a plurality of distance sensing means such as measuring members 92, 93 and 94 slidably mounted thereon adjacent the three axes of a three dimensional system of rectangular coordinates. To this end the plate 87 of platform 83 desirably has a transverse slot 95 therein adjacent the end edge 96 thereof, the plate 87 of wall 84 desirably has a vertical slot 97 therein adjacent the inner edge or origin 98 of the frame and the plate 87 of wall 85 desirably has a longitudinal slot 101 therein adjacent the lower edge 102 thereof.

The measuring members each desirably comprises a pair of blocks 103, 104 positioned respectively on each side of the associated slot and retained together by a screw 107.

One of the blocks, i. e., block 103 is positioned on the outer surface of the associated scale 87 to define a finger to engage the object being measured and the other of said blocks, i. e., the block 104 which is on the inner side of the associated plate 87 has a projecting portion or rib 105 which extends into the slot to guide the measuring member therealong.

Although the measuring members as illustratively shown are manually movable along the associated slots, it is of course to be understood that they could be normally spring retained at the ends 110 of such slots and moved into engagement with the extremities of the object being measured by any suitable mechanical or electrical means which would be obvious to one skilled in the art.

Figure 3:
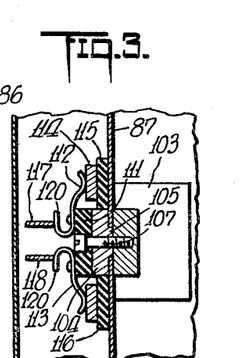
Fig. 3 is a detail sectional view on a larger scale taken along line 3—3 of Fig. 2.
Figure 4:
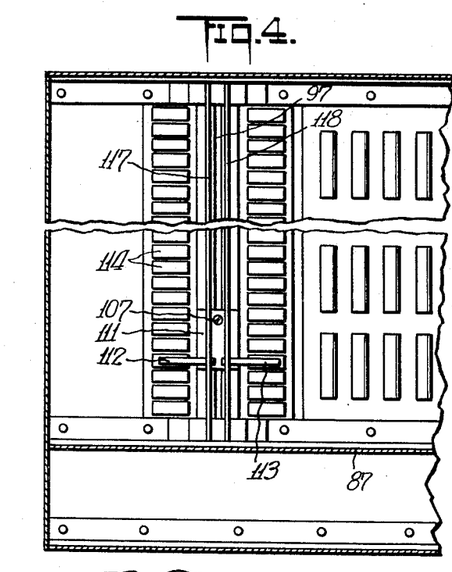
Fig. 4 is a view similar to Fig. 3 taken along line 4—4 of Fig. 2.

Desirably the screw 107 of each of the measuring members also mounts an insulating strip 111 to the guide member 104 as shown in Fig. 3, the insulating strip carrying a pair of wiper arms 112 and 113, which may respectively engage the spaced contact strips 114 affixed on insulating strips 115 and 116 which extend parallel to each of the slots 95, 97 and 101 on each side thereof respectively. Desirably, the affixed ends of the wiper arms 112 and 113 are reversely bent as at 120 and each engages a conducting rail 117 and 118 respectively, the latter being supported at their ends on the associated plate 87 and insulated therefrom. Each of the plates 87 desirably has an insulating panel 119 mounted on the inner face thereof which support the various resistors utilized in the operation of the equipment and which will be more fully described hereinafter.

With the construction above described, after the measuring members 92, 93 and 94 are moved to the ends 110 of the associated slots if, for example, a rectangular object, is placed on platform 83 as shown in Fig. 1 with its corner at the origin 98 and engaging the end wall 84 and the rear wall 85 and the measuring members are moved along their associated slots so that the associated fingers 103 engage the top, end and side of the box, the wiper arms 112 and 113 controlled by each of the measuring members, will engage the associated contact strips 114 correlated with the longitudinal, transverse and vertical dimension of the object. In addition the weight of the object on the platform 3 will affect the weighing scale, which is previously set at zero to compensate for the weight of the frame 82, so that the contact rollers 55 and 56 mounted on the drum 42 will engage the associated contact strips 62 on rings 57 and 58 correlated with the weight of the object.

The electrical circuits hereinafter described are controlled by the dimensions and by the weight of the object in order to determine the desired rating (whether according to volume or to weight) upon a meter 122 mounted on the front wall 123 of the housing 21 and which desidably is calibrated in monetary units such as in cents, automatically to register the charge or rating of the particular object.

If desired the housing may also have a meter 124 indicating volume and a meter 125 indicating weight. The equipment may also have one or more additional control switches to introduce further factors that may be significant in determining the rating of the object. Thus, there is shown on housing 21 a manually operable control switch 126 designated a ratio switch, which serves to set up a predetermined relation between weight and volume in determining the rating. Moreover there is shown a switch 127 designated the zone switch which serves to multiply the basic charge or rating by a predetermined factor illustratively in accordance with the postal or other zone to which the object is to be transferred.

Thus the meter 122 will indicate the amount to be charged for transportation of an object placed on the equipment, such charge to depend usually on weight. But in all such cases where the volume is to be the controlling factor, such volume rather than the weight, shall control the meter reading, which reading automatically takes into account also the ratio factor determined by switch 126 and the zone factor determined by switch 127, all of which will appear more clearly from the following description of the electrical circuits.

Figure 9:
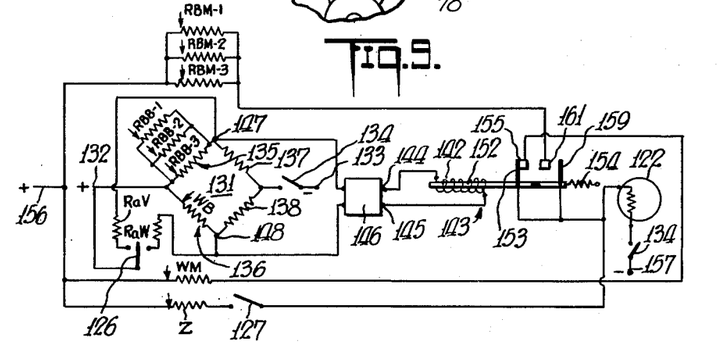
Fig. 9 is a simplified circuit diagram showing the principle of the invention.

Referring now to the simplified circuit diagram in Fig. 9 there is shown a discriminator circuit illustratively in the form of a Wheatstone bridge 131 supplied from a source of fixed potential 132 and 133, a switch 134 mounted on the front panel 123 of the housing 21, being in series with source 132, 133. The arm 135 of the bridge is of variable resistance and desirably comprises three resistor banks designated RBB-1, RBB-2 and RBB-3, each of value to effect a current flow proportional to the logarithm of the dimension being measured and which may be mounted respectively on insulating plates 119 on wall 85, platform 83 and wall 84 to measure length, width and height respectively, said resistor banks being connected in parallel and of value to effect a combined current flow therethrough which is proportional to the logarithm of the volume of any object being rated. The arm 136 of the bridge is also of variable resistance and illustratively comprises a resistor bank WB suitably mounted in the housing 21 and of value to effect a current flow therethrough which is determined by the weight of the same object, which current (for a pre-determined relation between volume and weight) is to be equal to the current through arm 135. Arms 137 and 138 of the Wheatstone bridge are desirably fixed resistances of equal value that serve to balance the bridge as readily understood.

The circuit shown in Fig. 9 is connected normally to effect a reading on the rating meter 122 which is based on the weight parameter, but has a switch, automatically to render the volume the parameter which effects the reading on the rating meter, under conditions where the volume becomes the predominant parameter upon which the rating is to be based. For this purpose the coil 142 of a polarized relay 143 illustratively of the type put out by Struthers Dunn Company of Philadelphia, Pa., and designated 59–XAX, may be connected across contacts 144 and 145 of a servo amplifier 146 such as the type put out by the Brown Instrument Division of the Minneapolis-Honeywell Regulator Co. and designated Brown Electronik "continuous balance" unit No. 354,574 which is connected across points 147 and 148 of the Wheatstone bridge 131 to amplify the relatively weak currents therefrom.

The armature 152 of the relay carries a switch arm 153 normally urged by coil spring 154 against fixed contact 155 for normal connection to the rating meter 122 of a variable resistance WM also mounted in suitable manner in housing 21 and identical with the resistance WB in the weight arm 136 of the Wheatstone bridge, and supplied from a source of potential 156, 157, the source 157 also being applied through switch 134 which is of the double pole type.

The relay armature 152 also carries a second switch arm 159 normally disengaged from a corresponding fixed contact 161 and moved into engagement therewith upon energization of the relay coil 142 by a preponderating current through the volume arm 135 of the Wheatstone bridge. Upon such operation the circuit to resistance WM will be interrupted and instead a circuit will be completed to rating meter 122 through parallel connected volume resistor banks RBM-1, RBM-2 and RBM-3 mounted on insulating plates 119 and which are identical with the resistances in the volume arm 135 of the Wheatstone bridge and supplied from the source of potential 156, 157.

It may be desirable to introduce a factor in determining the rating in order to give a greater or lesser rating significance to the volume with respect to the weight, than that for which the circuit is normally set. This is desirably accomplished by providing auxiliary resistances R$a$V and R$a$W mounted in housing 21. These auxiliary resistances R$a$V and R$a$W may be placed in series with the Wheatstone bridge arms 135 or 136, but it is preferred to place them in parallel with such arms respectively as indicated in Fig. 9 of the drawings. Each of these resistances R$a$V and R$a$W is normally out of circuit by reason of the normally open switch 126 associated therewith. Each of these resistances is of value such as to pass a current proportional to the logarithm of the factor which it is to introduce. Accordingly, if resistor R$a$W on the weight side is placed in circuit, a greater current will flow through point 148 with its two parallel connected resistances WB and R$a$W than otherwise. On the other hand, if the corresponding resistor R$a$V on the volume side is placed in circuit a greater current will flow through point 147 with its parallel connected resistances RBM-1, RBM-2, RBM-3 and R$a$V.

In addition, an adjustable resistance Z in the meter circuit, is so connected that it may be placed in parallel with either the three-volume resistor banks RBM-1, RBM-2 and RBM-3 or the weight resistor WM to increase the current through the rating meter 122 by a predetermined multiple, in order to give a direct reading for various zones. This resistance Z, which is placed in circuit by the closing of switch 127, is of magnitude to pass a current proportional to the logarithm of the rating multiplier introduced, so that the anti-logarithmic scale on the rating meter 122 will show the product of the rating change caused by the weight or volume as the case may be by the zone multiplier.

The resistors in the volume arm 135 of the Wheatstone bridge and the corresponding resistors RBM-1, RB-2 and RB-3 in the rating meter circuit are controlled in unison as are also the resistor in the weight arm 136 of the Wheatstone bridge and the corresponding resistor WM in the rating meter circuit thereof. Accordingly, the resistors of each of such pairs will have the same effective value, depending on the volume or weight as the case may be of the object.

Figure 10:
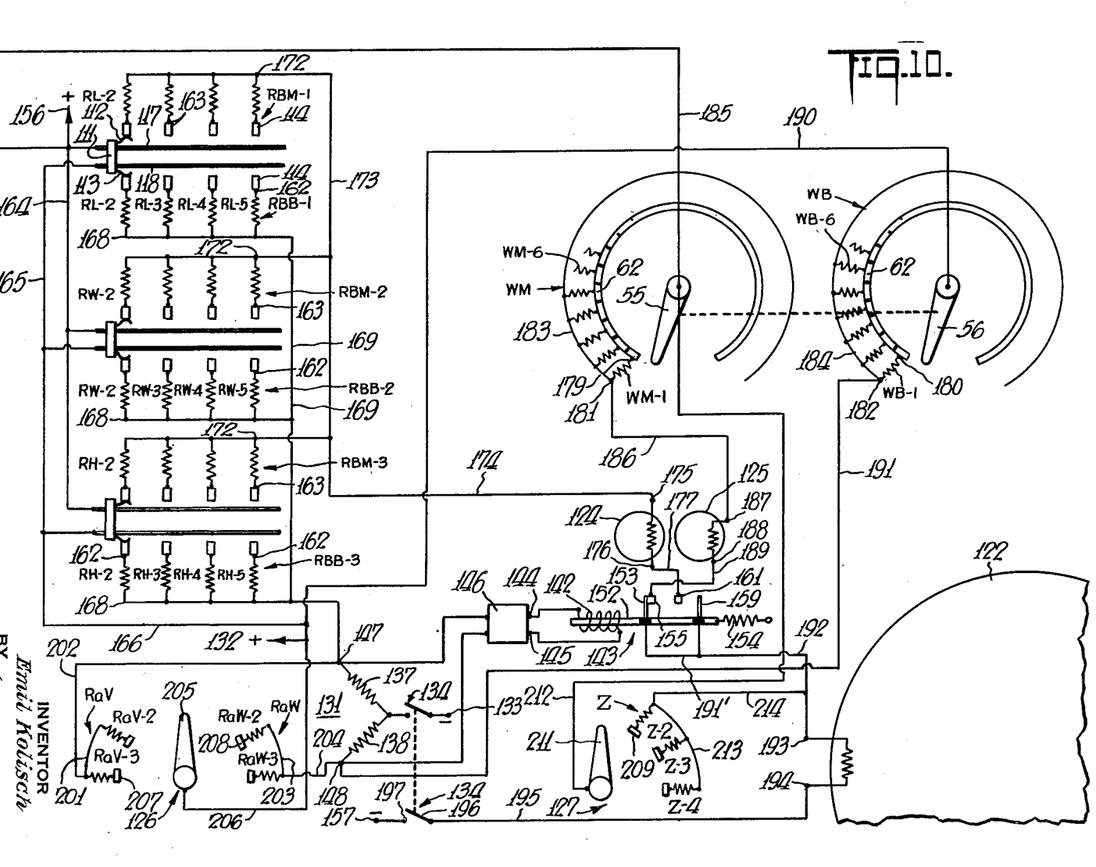
Fig. 10 is a more elaborate circuit diagram indicating the application of the principle of the invention in a substantially commercial embodiment thereof.

In the light of the foregoing description, the more detailed illustrative circuit of Fig. 10 shown in order to assure compliance with statutory requirements and now to be described will be more readily understood.

As shown in Fig. 10 in which the reference numerals correspond to those of Fig. 9, a resistor is connected at one end as at 162 to each of the contact strips 114 mounted on insulating strips 116 to form the bridge resistor banks RBB-1, RBB-2 and RBB-3 respectively, four resistors being illustratively shown in each bank although it is to be understood that any desired number could be used, the resistors in each bank which are mounted on the associated insulating plate 119 being designated RL-2 to RL-5 to determine length, RW-2 to RW-5 to determine width and RH-2 to RH-5 to determine height. The resistors which form meter resistor banks RBM-1, RBM-2 and RBM-3 and which are connected at one end as at 163 to the contact strips 114 mounted on insulating strip 115 are respectively of identically the same values.

The contact rails 117 which are engaged by the associated wiper arms 112 which ride on the contact strips 114 mounted on the insulating strip 115, are connected together by common lead 164, which is connected to positive source 156. The contact rails 118 engaged by the associated wiper arms 113 which ride on the contact strips 114 mounted on the insulating strip 116 are connected together by common lead 165 which is connected to positive source 132 by lead 166. The ends 168 of resistor banks RBB-1, RBB-2 and RBB-3 are connected by common lead 169 to point 147 of the Wheatstone bridge 131. The ends 172 of resistor banks RBM-1, RBM-2, RBM-3 are connected together by common lead 173 which is connected by lead 174 to the terminal 175 of meter 124, which desirably has an anti-logarithmic scale, terminal 176 of said meter being connected by lead 177 to fixed contact 161 of relay 143, said contact 161 as previously pointed out being normally spaced from contact 159 carried by armature 152 of said relay 143.

The weighing scale shown in Fig. 1 controls the movement of the contact rollers 55 and 56 on the contact strips of rings 57 and 58, which are connected respectively to resistor banks WM and WB. Such resistor banks WM and WB desirably comprise a plurality of resistors, six of which are illustratively shown and designated respectively WM–1 to WM–6 and WB–1 to WB–6 inclusive, each resistor being associated with a given weight. The resistor banks WM and WB are so arranged that upon movement of the associated contact rollers 55 and 56 thereon by the weight of an object placed on platform 83 of the weighing scale only one of the resistors of each of the resistor banks WM and WB will be in circuit. For this purpose one end 179, 180 of each of the resistors in each of the resistor banks WM and WB is connected to an associated contact strip 62 shown in Fig. 7 in each ring 57, 58 respectively. The other ends 181, 182 of each of the resistors in each of the resistor banks WM and WB are connected by common leads 183 and 184 respectively. Rollers 73 and 74 are electrically connected respectively by leads 185 and 190 to positive mains 156 and 132. The common lead 184 of resistor bank WB is connected by lead 191 to point 148 of Wheatstone bridge 131 and the common lead 183 of resistor bank WM is connected by lead 186 to terminal 187 of weight meter 125 which also desirably has an anti-logarithmic scale, the terminal 188 of said meter being connected by lead 189 to fixed contact 155 normally engaged by contact 153.

The contact 153 carried by armature 152 which normally engages fixed contact 153, is movable away therefrom when the coil 142 of relay 143 is energized, the movement of the armature at such time also bringing contacts 159 and 161 into engagement. As shown in Fig. 10 the contacts 153 and 159 are connected by lead 191' which in turn is connected by lead 192 to terminal 193 of rating meter 122, the other terminal 194 of which is connected by lead 195 to the movable arm 196 of the switch 134, said arm being normally spaced from the fixed contact 197 connected to negative main 157.

The resistor banks RaV and RaW associated with ratio switch 126 shown in Fig. 1, each desirably comprises a plurality of resistors, only two of which are shown in Fig. 10, resistors RaV–2 and RaV–3 being at the left and resistors RaW–2 and RaW–3 being at the right. The RaV resistors are connected by lead 201 and lead 202 to point 147 on the volume side of the Wheatstone bridge 131, while the RaW resistors are connected by leads 203 and 204 to point 148 on the weight side of the Wheatstone bridge. Thus when arm 205 of ratio switch 126, which is connected to positive main 132 by lead 206, is thrown to the left to engage the terminal 207 of any of the RaV resistors, that resistor is connected in parallel with the three parallel connected resistance banks RBB–1, RBB–2 and RBB–3 of the volume bank, and when said switch arm 205 is thrown to the right to engage the terminal 208 of any of the RaW resistors, that resistor is connected in parallel with the resistor bank WB.

The zoning resistor bank Z shown in Fig. 10 desirably comprises a plurality of resistors, three of which are shown and indicated as Z–2, Z–3 and Z–4, the terminals 209 of which may be selectively engaged by the switch arm 211 of switch 127, which is connected by leads 212 and 185 to the positive main 156. Resistors Z–2, Z–3 and Z–4 are electrically connected at their other terminals at 213 and through lead 214 are connected to the terminal 193 of the rating meter 122.

DETERMINATION OF RESISTOR MAGNITUDES

Illustrative values will now be determined for the resistor sections of the two identical sets of resistor banks RBB–1, RBB–2 and RBB–3, and RBM–1, RBM–2 and RBM–3 of the equipment shown in Fig. 10 and above described, on the assumption that a line voltage of 110 volts D. C. is utilized.

If the current passing through each of the resistor banks RBB1, RBB–2 and RBB–3, for example, is proportional to the logarithm of the corresponding dimension classification, the sum of the currents through each of the resistor banks will be of such value that the anti-logarithm thereof (to be read as such or with corresponding monetary value on meter 122) will equal the product of the three dimensions or the volume classification of the object.

As appears in Tabulation I hereinafter set forth, the second column is the logarithm (to two decimal places) of each of the dimensional values from 2 to 5 in the first column, which is headed "Classification." For convenience in calculations, the third column will be the logarithm multiplied by 100 and considered as milliamperes and the resistances, in the fourth column are readily determined from Ohm's Law by dividing the impressed voltage of 110 by the current in milliamperes.

*Tabulation I*

| Classification | Logarithm | Current in Milliamperes | Resistance in Ohms required in Circuit |
|---|---|---|---|
| 2 | 0.30 | 30 | 3,666 |
| 3 | 0.48 | 48 | 2,292 |
| 4 | 0.60 | 60 | 1,833 |
| 5 | 0.70 | 70 | 1,571 |

From Tabulation I it can be seen that for an object having a length of two units and which will cause a current flow of 30 ma., 3,666 ohms must remain in the circuit. If the length of the object is three, four or five units, from Tabulation I we see that there must be 2,292, 1,833 or 1,571 ohms in circuit in order to give the desired current reading of 48, 60 or 70 ma.

With resistors having values thus determined, the total current flow through the parallel connected resistor banks RBB–1, RBB–2 and RBB–3 will be proportional to the logarithm of the product of the dimensions, i. e., to the volume being measured. Thus, for example, if the unit of measurement is considered to be inches, if an object 2 inches by 2 inches by 2 inches is being measured, the current flow through each of the resistor banks RBB–1, RBB–2 and RBB–3 will be 30 ma. or a total of 90 ma., which is proportional to the logarithm of the volume of the object. From a table of logarithms the anti-logarithm of .90 is read as 8, the corresponding product which is the volume of the object that will be read as such or in corresponding monetary value upon the meter 122 which is illustratively calibrated in cents in increments of five.

In order to determine the values of the weight resistor banks WB and WM let it be assumed that 8 cubic inches of volume shall have the same rating as one pound of weight. Then with the circuit shown, weight will determine the rating whenever the object has a volume of 8 cubic inches or less for each pound of weight. Whenever this relation is achieved by the volume and the weight of an object, the contacts 153 and 155 of the relay 143 remain in engagement. But when an object is being rated which has a volume of more than 8 cubic inches for one pound of weight, contacts 153 and 155 will disengage to connect weight resistor bank WM and the contacts 159 and 161 of the relay will be moved into engagement to switch the output of volume resistor banks RBM-1, RBM-2 and RBM-3 to meter 122.

More specifically it is apparent that when the current through the volume arms RBB-1, RBB-2 and RBB-3 of the bridge is equal to the current through the weight arm WB, the bridge will be balanced and no current will flow through coil 142. Hence contacts 153 and 155 will remain in engagement due to the spring 154 so that the resistor bank WM will be connected to meter 122.

If the current through the weight arm of the bridge should be greater than that through the volume arm, the bridge will be unbalanced and current will flow through coil 142. However, as the armature 152 of the relay is polarized and positioned so that such current will flow in direction not to move said armature, contacts 153 and 155 will remain in engagement and volume resistor bank WM will remain connected to meter 122.

If, however, the current flowing through the weight arm WB of the bridge should be less than the current flowing through the volume arm thereof, the bridge also will be unbalanced, but the current flowing through coil 142 will flow in the opposite direction. As a result polarized armature 152 will move to disconnect contacts 153 and 155 and connect contacts 159 and 161 to disconnect weight resistor bank WM and to connect volume resistor banks RBM-1, RBM-2 and RBM-3 in circuit with meter 122.

For the purpose of illustration, if we assume that the object has a volume of 40 cubic inches, the weight must be 5 pounds in order that the typical relation of not more than 8 cubic inches to one pound be maintained. For a volume of 40 cubic inches, 160 ma. of current will flow in the volume resistor banks RBB-1, RBB-2 and RBB-3. It is therefore necessary that for the bridge to be balanced when the weight of the object is 5 pounds, 160 ma. must flow through the weight resistor bank WB. At 110 volts this will require that resistor WB-2 which is associated with the 5 pound indication of the scale be 688 ohms.

Accordingly, the following tabulation will show the resistances required in the weight banks for typical values when the rating for 8 cubic inches equals that for one pound.

*Tabulation II*

| Volume in Cubic Inches | Weight in Pounds | Current in Milliamperes | Value in Ohms |
|---|---|---|---|
| 8 | 1 | 90 | WB-1, WM-1—1,222. |
| 16 | 2 | 120 | WB-2, WM-2—917. |
| 24 | 3 | 138 | WB-3, WM-3—797. |
| 32 | 4 | 150 | WB-4, WM-4—733. |
| 40 | 5 | 160 | WB-5, WM-5—688. |

When a greater volume than the illustrative 8 cubic inches is to have a rating equal to one pound of weight, as for example, when twice that volume or 16 cubic inches is to have the same rating as one pound, it is merely necessary appropriately to increase the current flowing to point 148 or the weight portion of the bridge for balance.

For this purpose it is merely necessary to add resistance in parallel with the weight arm of the bridge the value of which will produce a current which is proportional to the logarithm of two so that the current flow would be that caused by a weight of 2 pounds. From Tabulation I it appears that the required resistance, RaW-2 is 3,666 ohms, which will increase the current flow to point 148 to 120 ma. Similarly, if it is desired to change the ratio to 24 cubic inches to one pound, it is merely necessary to multiply by three and the value of resistor RaW-3 to effect current flow proportional to the logarithm of three is 2,292 ohms.

Where a lesser volume than the illustrative 8 cubic inches is to have a rating equal to one pound of weight, as for example, where up to but not including twice the weight or two pounds is to have the same rating as 8 cubic inches, it is merely necessary appropriately to increase the current flowing to point 147 or the volume side of the bridge for balance.

This may be accomplished by adding resistance in parallel with the volume arm of the bridge to increase the current to point 147 and the values of such resistors RaV-2 and RaV-3 are identical with the respective resistors RaW-2 and RaW-3, i. e., 3,666 ohms and 2,292 ohms respectively.

As previously pointed out, the meter 122 has an anti-logarithmic scale calibrated to read the charge in cents or other monetary units. Assuming that a charge of five cents is made for every pound or for every 8 cubic inches, the meter will read 10, 15, 20 or 25 cents when the object weighs 2, 3, 4 or 5 pounds or has a volume of 16, 24, 32 or 40 cubic inches respectively.

If the charges to be made are based on zones and the basic charge for a one pound package of volume of 8 cubic inches or less in zone 1 is 5 cents, it may be doubled or trebled for zones 2 or 3 for example by adding either the resistor Z-2 or Z-3 in parallel with the parallel connected resistor banks RBM-1, RBM-2, RBM-3 or with resistor bank WM as the case may be by movement of switch arm 211. The resistors Z-2 and Z-3 are of value to increase the current flow to the desired amount to give a reading on meter 122 which is double or triple the basic reading.

OPERATION

To rate an object which may be, for example, 2 inches by 2 inches by 2 inches, it is merely necessary to place it on platform 83 and move the measuring members 92, 93, 94 in engagement therewith as previously described.

As a result, the associated wiper arms 112, 113 will engage the contact strips 114 associated with resistors RL-2 of resistor banks RBB-1 and RBM-1, resistors RW-2 of resistor banks RBB-2 and RBM-2, and resistors RH-2 of resistor banks RBB-3 and RBM-3.

If the object weighs one pound, for example, contact rollers 55 and 56 will engage the contacts 62 on rings 57 and 58 associated with resistor WM-1 and WB-1 respectively.

When the frame 82 which is carried by the weighing scale is at rest the operator may close switch 134. As a result a circuit will be completed from the source of power 132, lead 166 to the common lead 165 connected to rails 118 associated with resistor banks RBB-1, RBB-2 and RBB-3, through such rails, wiper arms 113 and resistors RL-2, RW-2 and RH-2 to common leads 168 which is connected to point 147 of the bridge 131.

As the resistors RL-2, RW-2 and RH-2 are in parallel the resultant current which will flow through the point 147 of the bridge 131 and resistor 137 through closed switch 134 to negative main 133 will be 90 ma. Similarly the same amount of current will flow through from positive main 156, lead 165 through rails 117, wiper arms 112, resistors RL-2, RW-2 and RH-2 of resistor banks RBM-1, RBM-2 and RBM-3, common lead 172, leads 173, 174 and meter 124 to fixed contact 161 of relay 143 when the contact 161 is connected in circuit.

With the weight of one pound on platform 83, current will flow through resistor WB-1 which has a value of 1,222 ohms so that a current of 90 ma. will flow therethrough. The current is from positive main 132, through leads 190, bracket 78, roller 74, slip ring 68, conducting strip 66, bracket 52, roller 56, strip 62, resistor WB-1 associated therewith, common lead 184, lead 191 to point 148 of the bridge.

Similarly, the same amount of current will flow from positive main 156, lead 185, bracket 77, roller 73, slip ring 67, conducting strip 65, bracket 51, roller 55, strip 62, resistor WM-1 associated therewith, common lead 183, lead 186, meter 125, lead 189 to contact 155 which is engaged by movable arm 153 thence through leads 191', 192, meter 122, lead 195, closed switch 134 to negative main 157.

As the currents applied to points 147 and 148 of the bridge are identical the bridge will be in balance and hence no current will flow through the coil 142 of relay 143. As a result movable contact 153 thereof will remain in engagement with fixed contact 155. The 90 ma. of current flowing through meter 122 and through meter 125 will cause a reading of 5 cents to be effected on meter 122 and one pound on meter 125.

If the object should have a volume of 8 cubic inches and the weight should be, for example, 2 pounds, the current flowing to point 147 of the bridge will be 90 ma. as previously described. The current through resistor WB-2 which will be in circuit at a weight of 2 pounds, to point 148 of the bridge will be 120 ma. As a result the bridge will be unbalanced and current will flow through the servo amplifier 146 to be amplified and through coil 142 of relay 143. However, as the armature 152 is polarized in manner so that it will not move when the weight current preponderates, contacts 153 and 155 will remain in engagement. Consequently, 120 ma. of current will flow through meters 125 and 122 as previously described so that meter 125 will indicate 2 pounds and meter 122 will indicate 10 cents.

If the object being measured should be 2 inches by 2 inches by 4 inches or 16 cubic inches and the weight should be one pound, the current flowing to point 147 of the bridge due to parallel resistor banks RBB-1, RBB-2 and RBB-3 will be 120 ma., whereas the current at point 148 of the bridge from resistor WB-1 will be 90 ma. As a result, the bridge will be unbalanced and current will flow through coil 142 in direction to draw the polarized armature 152 to the left as shown in Fig. 10. Consequently, movable contact 153 will be disconnected from fixed contact 155 and movable contact 159 will engage fixed contact 161. As a result a current of 120 ma. will flow through meters 122 and 124 to indicate 10 cents and 16 cubic inches respectively.

The operation thus far described has been with respect to the predetermined relation of 8 to 1 with a charge of 5 cents for each 8 cubic inches or each pound. Where it is desired to allow the shipper to transport double the volume for a given weight for the same price, that is, 16 cubic inches for five cents, it is merely necessary to move switch arm 205 so that it engages contact 208 associated with resistor RaW-2 which has a value of 3,666 ohms, to put the latter in parallel with the resistors in the resistor bank WB.

Thus, for example, if the volume is 16 cubic inches and the weight is one pound, the current through resistor banks RBB-1, RBB-2 and RBB-3 to point 147 of the bridge as previously pointed out will be 120 ma. Resistor RaW-2 will be in parallel with resistor WB-1 which has a value of 1222 ohms so that the total resistance will be 917 ohms and 120 ma. will also flow to point 148. Consequently the bridge will remain balanced when the volume of the object is 16 cubic inches and its weight is one pound. With the bridge in balance no current will flow through coil 142 and the circuit previously described will be completed through resistor WM-1 and meters 125 and 122 and as 90 ma. will flow through said meters they will indicate one pound and five cents respectively.

If the volume should be greater than 16 cubic inches, such as for example, 24 cubic inches, and the weight should still be one pound with the ratio switch arm 205 still engaging the contact 208 associated with resistor RaW-2, 138 ma. will flow to point 147 of the bridge thereby unbalancing the bridge in the manner previously described so that the resistor banks RBM-1, RBM-2 and RBM-3 will be placed in series with the meters 124 and 122 and a current of 138 ma. will flow through such meters to give a volume indication of 24 cubic inches and a charge of fifteen cents respectively.

Similarly, if it is desired to allow the shipper to transport up to but not including double the weight for a given volume for the same price, that is, up to but not including two pounds for five cents with a relation such as 8 to 2, between volume and weight, it is a simple matter to move movable contact arm 205 of ratio switch 126 to engage fixed contact 207 to place resistor RaV-2 in parallel with the volume resistor banks RBB-1, RBB-2 and RBB-3.

The addition of resistor RaV-2 which has a value of 3,666 ohms, in parallel with the resistance of parallel connected resistor banks RBB-1, RBB-2 and RBB-3 which have a combined value of 1,222 ohms for 8 cubic inches will give a resultant resistance of 917 ohms so that the 120 ma. will flow to point 147 of the bridge to overcome the 90 ma. flowing through the weight arm of the bridge due to a weight of over one pound but less than two pounds on the scale. Consequently the relay will be energized to switch resistor banks RBM-1, RBM-2 and RBM-3 in circuit and as a current of 90 ma. is flowing through such resistors a charge of but five cents will be indicated on meter 122, even though the weight of the object is, for example, 1.9 pounds.

In the event, however, an object being rated should have a relation between volume and weight equal to or greater than 8 to 2 the bridge will be balanced when the relation is equal to 8 to 2 or unbalanced in favor of weight when the relation is changed, i. e., to 8 to 3. In either case, the weight resistors WM will be in circuit as previously described and the charge on meter 122 will indicate 10 or 15 cents as the case may be based on the weight of the object.

With the zoning switch 127 in the position shown in Fig. 10 the current flow through the charge meter 122 will depend solely upon the current flowing through either the volume resistor banks RBM–1, RBM–2 and RBM–3 or the weight resistor bank WM, whichever is in circuit. If, for example, the weight resistor bank is in circuit and a weight of one pound is producing a current of 90 ma. through the meter, a reading of five cents will be given. If it is desired to double the rate in the event that the package is to be shipped to a second zone further away, it is a relatively simple matter to move switch arm 211 of zone switch 127 to engage contact 209 associated with resistor Z–2 so that the latter will be put in parallel with resistor WM–1. As resistor Z–2 has a value of 3,666 ohms and resistor WM–1 has a value of 1,222 ohms, the resultant resistance will be 917 ohms so that 120 ma. will flow through meter 122 to indicate a charge of ten cents. Similarly the charge may be multiplied by 3, 4 or other factors as desired.

By means of the method and equipment above set forth, the rating of objects may be determined in rapid sequence upon meter 122 as may also, if desired, the volume of each object on meter 124 and its weight on meter 125. With equipment of approximately large dimensions, the rating, volume or weight of a generally rectangular stack or pile or collection of articles may be determined as a group in one operation. After each object or group of objects is removed from the platform 83 and the switch 134 released, the equipment becomes automatically cleared by the interruption of the circuit to power sources 133 and 157.

While the equipment herein is ordinarily used for rating rectangular objects it is of course capable of rating round objects or irregular objects as the measuring members may be readily adapted to engage the extremities of such objects.

As many changes could be made in the above equipment and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for rating an object according to its respective dimensions, comprising a frame to carry such object, slidable means on said frame to engage the top, an end and a side of said object to determine its height, length and width respectively, circuit control means responsive to the position of said slidable means, and current limiting means under control of the respective control means and each of magnitude to pass a current proportional to the logarithm of the corresponding dimension of such object.

2. Equipment for rating an object according to its respective dimensions, comprising a frame having a substantially rectangular horizontal platform to carry such object, said platform having upstanding walls along two adjacent edges thereof, slidable means on said platform and each of said walls to engage an end, a side and the top of such object to determine its length, width and height respectively, circuit control means responsive to the position of said slidable means, and current limiting means under the control of the respective control means and each of magnitude to pass a current proportional to the logarithm of the corresponding dimension of such object.

3. Equipment for rating an object according to its respective dimensions, comprising a frame having a substantially rectangular horizontal platform to carry such object, said platform having upstanding walls along two adjacent edges thereof, said platform and said walls having elongated slots therein adjacent the three axes of a three dimensional system of rectangular coordinates, slidable means movable along each of said slots to engage the top, an end and a side of such object to determine its height, length and width respectively, circuit control means responsive to the position of said slidable means, and current limiting means under the control of the respective control means and each of magnitude to pass a current proportional to the logarithm of the corresponding dimension of such object.

4. The combination set forth in claim 3 in which the control means comprises a plurality of contact strips associated with each of said slots and each of said control means comprises a wiper arm adapted to engage said contact strips, the current limiting means comprises a resistance connected to each of said contact strips and placed in circuit when the associated contact strip is engaged by the wiper arm.

5. The combination set forth in claim 4 in which a conducting rail is associated with each of said slots and extends parallel thereto and said wiper arm normally engages said conducting rail.

6. The combination set forth in claim 3 in which the control means comprises an insulating strip associated with each of said slots and extending parallel thereto, a plurality of contact strips are mounted on each of said insulating strips, each of said control means comprises a wiper arm adapted to engage said contact strips, a conducting rail is associated with each of said slots and extends parallel thereto, said wiper arm normally engaging said conducting rail, and the current limiting means comprises a resistance connected to each of said contact strips and placed in circuit when the associated contact strip is engaged by the wiper arm.

7. The combination set forth in claim 6 in which said circuit control means comprises a pair of blocks affixed to each other and positioned respectively on opposite sides of the associated slot and said wiper arm is mounted on said blocks and insulated therefrom.

8. The combination set forth in claim 6 in which said circuit control means comprises a pair of blocks affixed to each other and positioned respectively on opposite sides of the associated slot, one of said blocks having an insulating strip affixed thereto and mounting said wiper arm.

9. The combination set forth in claim 6 in which said platform and said walls each comprises a pair of spaced parallel plates and said slots are in the plates on the inside of said frame and said insulating strips are positioned in the space between said plates affixed to the plates having the slots therein.

10. Equipment for rating objects, comprising a frame to carry such object, slidable means on said frame to engage the top, an end and a side of said object to determine its height, length and width respectively, circuit control means responsive to the position of said slidable means, current limiting means under control of the respective control means and each of magnitude to pass a current proportional to the logarithm of the corresponding dimension of the object, a weighing scale carrying said frame, circuit control means responsive to the weight of such object, current limiting means under control of the latter control means, said two current limiting means being correlated so that for corresponding sequences of numerical values of volume and weight, the currents passed by the respective current limiting means are equal, an electric indicating device having a response that has an anti-logarithmic relation to the current flow therethrough, and means responsive to the relative currents in the respective current limiting means, selectively to pass through the electric indicating device a current equal to that through one or the other of said current limiting means.

11. Equipment for rating an object comprising a frame to carry such object, slidable means on said frame to engage the top, an end and a side of such object to determine its height, length and width respectively, circuit control means responsive to the position of said slidable means, current limiting means under control of the respective control means, said control means being designed to place a portion of the current limiting means in circuit of magnitude correlated respectively with the corresponding dimensions of the object, a weighing scale carrying said frame, circuit control means responsive to the weight of the object on said frame, current limiting means under control of the latter control means, said first current limiting means and said second current limiting means being correlated so that for corresponding sequences of numerical values of volume and weight, the currents passed by the respective current limiting means are equal, an electric indicating device having a response related to the current flow therethrough and means responsive to the relative currents in said two current limiting means, selectively to pass through the electric indicating device current equal to that through one or the other of said current limiting means.

12. The combination set forth in claim 11 in which said frame has a substantially rectangular horizontal platform to carry such object, said platform having upstanding walls along two adjacent edges thereof, said slidable means being movable along said platform and each of said walls to engage the end, a side and the top of such object respectively.

13. The combination set forth in claim 11 in which said scale includes a rotatable member, the circuit control means comprises contact means carried by said rotatable member, a contact ring comprising a plurality of contact strips associated with said contact means, said contact means engaging said contact strips as said rotatable member is revolved, each of said contact strips having a current limiting means connected thereto and placed in circuit when the associated contact strip is engaged by the contact means to give the indication correlated with the weight of such object.

14. The combination set forth in claim 11 in which said frame has a substantially rectangular horizontal platform to carry such object, said platform having upstanding walls along two adjacent edges thereof, said platform and said walls having elongated slots therein adjacent the three axes of a three dimensional system of rectangular coordinates, said slidable means being movable along each of said slots to engage the top, end and side of such object to determine its height, length and width respectively.

15. The combination set forth in claim 14 in which said first named circuit control means includes a pair of insulating strips extending longitudinally of each of said slots on each side thereof respectively, a plurality of spaced contact strips mounted on each of said insulating strips, each of said slidable members having a pair of wiper arms mounted thereon and insulated therefrom and from each other, said wiper arms engaging the contact strips on each of said insulating strips respectively, a pair of conducting rails associated with each of said slots extending longitudinally thereof and engaged respectively by said wiper arms, each of said contact strips having a resistance connected thereto and placed in circuit when the associated contact strip is engaged by the associated wiper arm.

16. The combination set forth in claim 11 in which said scale includes a rotatable member, the second named circuit control means comprises a pair of contact means carried by said rotatable member insulated therefrom and from each other, a pair of concentric contact rings each comprising a plurality of contact strips associated respectively with said pair of contact means, the latter engaging the contact strips in the associated ring, each of said contact strips having a resistance connected thereto and placed in circuit when the associated contact strip is engaged by the associated contact means to give the indication correlated with the weight of such object.

17. The combination set forth in claim 11 in which said scale includes a rotatable member, the second named circuit control means comprises a pair of contact means carried by said rotatable member, insulated therefrom and from each other, a pair of concentric contact rings each comprising a plurality of contact strips associated respectively with said pair of contact means, the latter engaging the contact strips on the associated ring, a second pair of contact means carried by said rotatable member, insulated therefrom and from each other and electrically connected respectively to said first pair of contact means, a pair of concentric slip rings engaged respectively by said second pair of contact means, each of said contact strips having a resistance connected thereto and placed in circuit when the associated contact strip is engaged by the associated contact means to give the indication correlated with the weight of such object.

18. Equipment for rating an object comprising a frame to carry such object, distance sensing means associated with said frame responsive to the height, length and width respectively of such object, current limiting means corresponding to height, length and width respectively, means responsive respectively to said sensing means for controlling the respective current limiting means to place in circuit so much of the current limiting means as is of magnitude correlated respectively with the corresponding dimensions of such object, volume current limiting means, means under control of said control means to place in circuit so much of said volume current limiting means as is of magnitude correlated with the volume of such object, weight determining means, weight circuit control means responsive to the weight of such object, weight current limiting means under control of the weight circuit control means, said volume current limiting means and said weight current limiting means being correlated so that for corresponding sequences of numerical values of volume and weight the currents passed by said volume and said weight current limiting means have a predetermined relation, an electric indicating device having a response related to the current flow therethrough and means responsive to the relative currents in said volume and said weight current limiting means, selectively to pass through the electric indicating device current related to that through one or the other of said volume and weight current limiting means.

19. Equipment for rating an object comprising a frame to carry such object, distance sensing means on said frame responsive to the height, length and width respectively, of such object, circuit control means responsive respectively to said sensing means, current limiting means under control of the respective control means, said control means being designed to place a portion of the associated current limiting means in circuit of magnitude correlated respectively with the corresponding dimensions of such object, weight determining means carrying said frame, circuit control means responsive to the weight of an object on said frame, current limiting means under control of the latter control means, said first current limiting means and said second current limiting means being correlated so that for corresponding sequences of numerical values of volume and weight, the currents passed by the respective current limiting means having a predetermined relation, an electric indicating device having a response related to the current flow therethrough and means responsive to the relative currents through said two current limiting means, selectively to pass through the electric indicating device current related to that through one or the other of said current limiting means.

References Cited in the file of this patent

UNITED STATES PATENTS

| Number | Name | Date |
|---|---|---|
| 1,560,046 | Dye | Nov. 3, 1925 |
| 1,573,850 | Naiman | Feb. 23, 1926 |
| 1,853,198 | Breadon | Apr. 12, 1932 |
| 2,025,407 | Williams | Dec. 24, 1935 |
| 2,108,575 | Benedict | Feb. 15, 1938 |
| 2,256,833 | McDonald | Sept. 23, 1941 |
| 2,341,182 | Jones | Feb. 8, 1944 |
| 2,431,696 | Keister | Dec. 2, 1947 |
| 2,449,019 | Smith | Sept. 7, 1948 |
| 2,517,180 | Davis | Aug. 1, 1950 |
| 2,571,161 | Poole | Oct. 16, 1951 |